United States Patent [19]

Kegelman

[11] Patent Number: 4,980,616
[45] Date of Patent: Dec. 25, 1990

[54] DRIVER CIRCUIT FOR INDUCTIVE ELEMENTS SUCH AS CRT DEFLECTION COILS

[75] Inventor: Thomas D. Kegelman, Palm Harbor, Fla.

[73] Assignee: Laboratory For Imaging Sciences, Inc., Tampa, Fla.

[21] Appl. No.: 470,675

[22] Filed: Jan. 26, 1990

[51] Int. Cl.$^5$ .................... H01J 29/70; H01J 29/76
[52] U.S. Cl. ........................... 315/408; 315/399
[58] Field of Search ................ 315/399, 408, 370

[56] References Cited

U.S. PATENT DOCUMENTS

| | | | |
|---|---|---|---|
| 2,880,341 | 3/1959 | Aikens | 313/422 |
| 3,596,165 | 7/1971 | Andrews | 363/19 |
| 3,944,884 | 3/1976 | Wilocki | 315/370 |
| 4,415,959 | 11/1983 | Vinciarelli | 363/21 |
| 4,441,058 | 4/1984 | Luz | 315/371 |
| 4,774,649 | 9/1988 | Archer | 363/20 |
| 4,827,183 | 5/1989 | Seats | 313/431 |
| 4,853,837 | 8/1989 | Gulczynski | 363/80 |

Primary Examiner—Gregory C. Issing
Attorney, Agent, or Firm—Dominik, Stein, Saccocio, Reese, Colitz & Van Der Wall

[57] ABSTRACT

A method and apparatus for driving inductive elements, such as deflection coils for a CRT, including a resonant bus, a bus capacitor, and at least two inductive branches grouped in a pair and connected to the bus, each inductive pair including serially-connected one of the inductive elements and a diode means, the diode means in one branch being connected in reverse direction relative to the other diode in the other branch to allow current flow in the one branch to flow from the resonant bus and to allow current flow in the other branch to flow to the resonant bus to produce a sine-squared current in each of the branches inverted with respect to the other and to produce a sinusoidal current in the bus capacitor.

30 Claims, 6 Drawing Sheets

ONE PERIOD OF SINE-SQUARED CURRENTS

DRIVER CIRCUIT FOR INDUCTIVE ELEMENTS SUCH AS CRT DEFLECTION COILS

BACKGROUND OF THE INVENTION

This invention relates to apparatuses and methods for driving multiple inductive elements such as deflection coils for cathode ray tubes or windings of rotating or linear magnetic motors. More particularly, this invention relates to apparatuses and methods for driving multiple inductive elements which permit substantially transient-free commutating between the inductive elements while minimizing losses introduced by the driver circuit. This invention also relates to a current waveform generation that provides a substantially linear electron beam scan of paraxial cathode ray tube. In addition, this invention relates to improvements to linear scan cathode ray tubes for detecting misalignment of the electron beam during the linear scan.

Presently there exists useful applications for a driver circuit apparatus and method for driving multiple inductive elements. For example, an improved driving circuit is needed for deflection coils for cathode ray tubes and windings of rotating or linear magnetic devices which permit substantially transient-free commutating between the many deflection coils or windings by switching which occurs only when both the current and voltage are zero. There also exists a need to minimize non-parasitic losses introduced into the inductive elements by the driver circuit.

Hence, an object of this invention is to provide a driver circuit apparatus and method for driving multiple inductive elements such as deflection coils for cathode ray tubes or windings of rotating or linear magnetic devices.

Another object of this invention is to provide a driver circuit apparatus and method for driving multiple inductive elements while achieving essentially transient-free commutating between such inductive elements.

Another object of this invention is to provide a driver circuit apparatus and method for driving multiple inductive elements in which the current and voltage in the circuit are both zero concurrently to permit transient-free commutating between the inductive elements.

Another object of this invention is to provide a driver circuit apparatus and method for driving multiple inductive elements while minimizing non-parasitic losses introduced into the inductive elements by the driver circuit.

Another object of this invention is to provide a driver circuit apparatus and method for driving deflection coils in a linear scan cathode ray tube such as that disclosed in U.S. Pat. No. 4,827,182 entitled "CRT With Elongated Envelope Having Non-Coaxial Portions".

Another object of this invention is to provide an improvement to a linear scan cathode ray tube for detecting misalignment of the electron beam during the linear scan.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a driver circuit apparatus and method for driving multiple inductive elements such as deflection coils for cathode ray tubes and windings of rotating or linear magnetic devices which permit substantially transient-free commutating between the deflection coils or windings that occurs only when both the current and voltage are concurrently zero, without the introduction of non-parisitic losses.

More particularly, the driver circuit apparatus and method of the invention comprises a resonant circuit in which the inductive elements are each serially connected with a commutatable unidirectional switch, preferably including a diode and a commutatable electronic switch, to form an inductive branch. The inductive branches are connected along a resonant bus in parallel to a bus capacitor, similar to a resonant tank, with means for initializing the bus. However, the inductive branches are paired, with the unidirectional switch in each pair reversed so that current in the paired branches flows in opposite directions to and from the resonant bus.

The unidirectional switches are commutated so as to produce a sine-squared current in each inductive branch which is displaced in phase and inverted with respect t the current in the adjacent branch and produces a sinusoidal current through the bus capacitor. Because a sine wave displaced by one-half of its peak to peak amplitude is a sine-squared wave, the voltage on the bus and current through the inductive branches and the bus capacitor are simultaneously zero, thereby allowing non-transient conditions during switching.

The electronic switches preferably comprise field effect transistor (FET) switches having low saturation resistance which introduce minimal losses into the driver circuit. However, in each inductive branch, a ground diode may be connected to ground and between the diode and the FET switch to reduce the dynamic resistance to the sum of the forward impedances of the diodes, thereby further minimizing induced losses. Additionally, a pull-up transistor may be provided not only for initializing the circuit, but to also periodically minimize errors resulting from mismatching of the inductive elements and related errors. Finally, frequency variations may be obtained by varying the capacitance of the bus capacitor.

As noted above, the driver circuit apparatus and method of the invention may be used to drive many types of multiple inductive elements such as deflection coils in cathode ray tubes (CRT). More particularly, one specific application for the driver circuit apparatus and method is to drive the deflection coils in a linear scan cathode ray tube such as that illustrated and described in U.S. Pat. No. 4,827,182 entitled "CRT With Elongated Envelope Having Non-Coaxial Portions", the disclosure of which is hereby incorporated by reference herein. In such a CRT, it is desirable to produce a linear scan of the electron beam at a constant rate to (a) minimize the variations in the rate of coulomb charge deposition which would result in intensity variations and (b) cause positional errors in time related modulation signals.

The driver circuit apparatus and method of the invention was conceived for such an application because it produces a substantially constant rate linear scan by generating a magnetic field in the deflection coils which increases and decreases in a $\sin^2(\omega t)$ fashion, but displaced in phase by $\Phi$ (e.g. $\pi/2$). Thus, by physically positioning the deflection coils at a displacement of $\Phi$ from each other, a scan is achieved.

Moreover, linearity of the scan is achievable by providing two of the driver circuits of the invention, each driving their respective set of deflection coils. By interlacing the deflection coils of each set, the coils are now displaced by $\Phi = \pi/4$ currents from the adjacent coils. Then, by correspondingly displacing the commutation of each driver circuit by $\pi/4$, a sine-squared current displaced in phase by $\pi/4$ is created in each succeeding deflection coil.

For example, in an 8 deflection coil CRT, 4 coils may be activated concurrently (one pair by each driver circuit), but displaced in phase by $\pi/4$. Still further linearity is achievable by increasing the number of deflection coils and combining additional driver circuits, so long as the coils are grouped with m bus (resonant) capacitors to form groups of paired inductive branches, where n = number of inductive branches per resonant bus. Therefore, the total number of coils = nm, where n = 2,3, ... n and m = 1,2, ... m.

This invention also comprises photodiode means positioned at the beginning and the end of the linear scan and associated electronics to detect misalignment of the electron beam during the linear scan due to undesired magnetic fields and CRT and circuit drift.

The foregoing has described broadly the more pertinent and important features of the present invention in order that the detailed description of the invention that follows may be better understood s that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE INVENTION

Figure 1A:
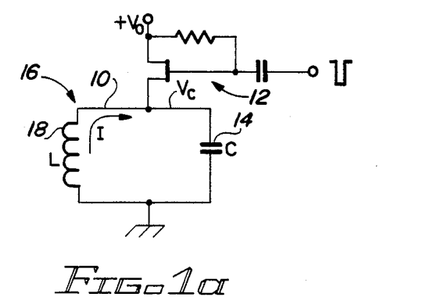
FIGS. 1a and 1b illustrate a simple prior art resonant tank circuit and resulting waveform.
Figure 1B:
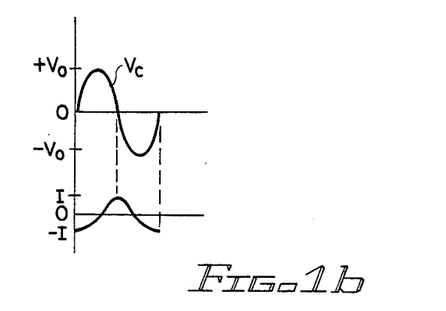

A simple prior art resonant tank circuit comprising a resonant bus 10 employing an initializing "pull "up" transistor 12, a bus capacitor 14 and a single inductive branch 16 including a single inductive element 18, is shown in FIG. 1a. The resulting waveform is illustrated in FIG. 1b.

DRIVER CIRCUIT

Figure 2A:
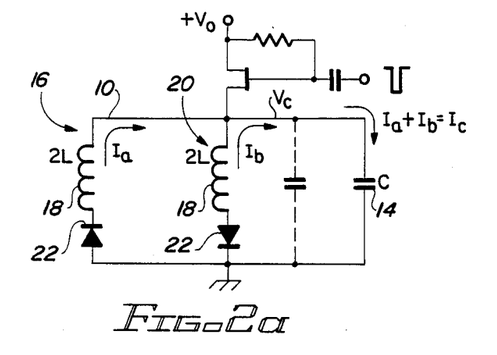
FIG. 2a illustrates the simple resonant tank circuit of FIG. 1 modified in accordance with the invention by the addition of a second inductive element and diodes to form paired inductive branches and FIG. 2b illustrates the resulting waveforms.

As shown in FIG. 2a, FIG. 1a is modified to a circuit having two inductive branches 16 and 20 grouped in a resonant pair, each including a single inductive element 18 and a diode 22, the diodes 22 being connected in reverse direction with each other to allow current flow to and from the resonant bus 10.

Figure 2B:
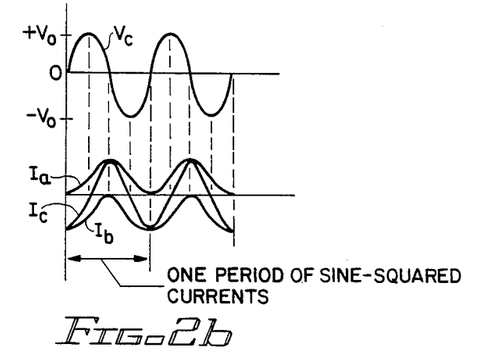

The resulting waveform is illustrated in FIG. 2b. The current waveforms in the inductive branches 16 and 20 are individually sine-squared waveforms displaced in phase by $\pi/2$ from their adjacent inductive branches. The current in the bus capacitor 14 is sinusoidal and in phase with the current in the inductive branches 16 and 20. Because mathematically $\sin^2(\omega t) = (1 - \cos(2\omega t))/2$, a sine wave displaced by one-half of its peak to peak amplitude is a sine-squared wave. Thus, the current (and voltage) in the inductive branches 16 or 20 (alternately) and the bus capacitor 14 are concurrently zero.

As shown in phantom in FIG. 2a, the frequency may be varied by switching in additional capacitors in parallel with the bus capacitor 14 or by otherwise varying the capacitance.

PREFERRED EMBODIMENT OF DRIVER CIRCUIT

Figure 3A:
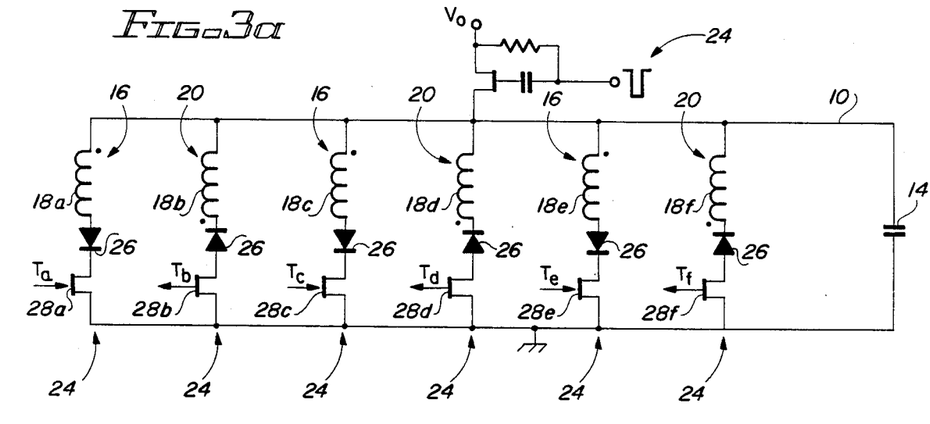
FIG. 3a illustrates the driver circuit of the invention comprising paired inductive branches, each including the inductive element and a commutatable unidirectional switch (diode and FET switch) connected in parallel with a bus capacitor.

As shown in FIG. 3a, the preferred embodiment of the driver circuit 24 of the invention comprises a plurality of inductive branches 16 and 20 grouped in pairs, each inductive branch 16 and 20 including series connected inductive element 18 and a commutatable unidirectional switch, generally indicated by numeral 24. Preferably, unidirectional switch 24 comprises series connected unidirectional device such as a diode 26 and a commutatable electronic switch 28 such as a P or N field effect transistor (FET) switch, with the diode 26 of each paired inductive branches 16 and 20 being reverse connected to allow currently flow only from and to the resonant bus 10, respectively. As shown, since the inductive elements 18 in each inductive pair 16 and 20 are driven by N and P drivers, the polarity of the elements 18 requiring that all P drivers be reverse wired with respect to the N drivers.

Figure 3B:
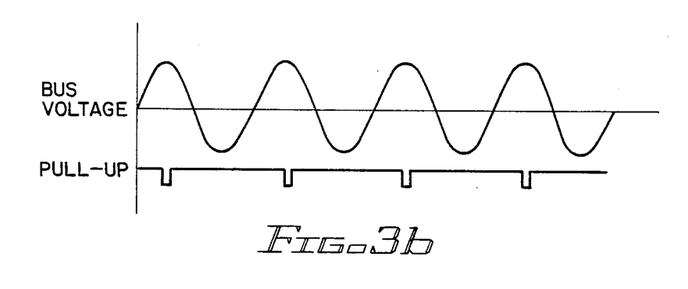
FIG. 3b illustrates the bus voltage and the pull-up timing pulses.

As shown in FIG. 3b, the initializing "pull-up" transistor 12 results in a sine-wave voltage occurring on the resonant bus 10 and, for the reasons explained below, is initialized once each cycle.

Figure 3C:
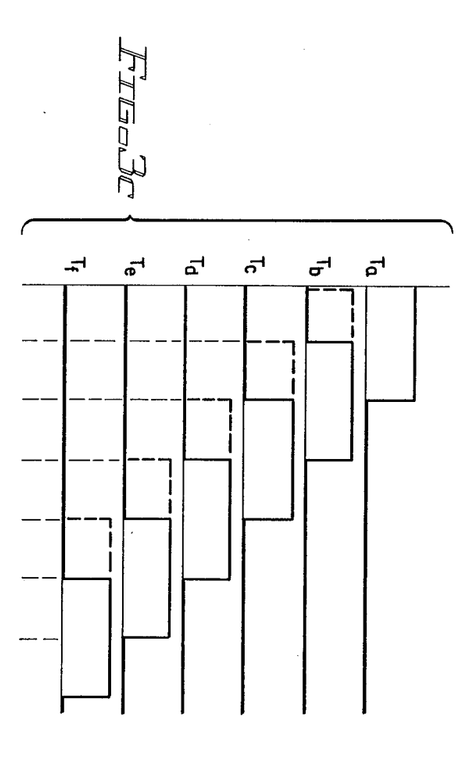
FIG. 3c illustrates the commutation timing diagram for the switches ($T_b$, $T_d$ & $T_f$ are negative but shown positive for clarity)
Figure 3D:
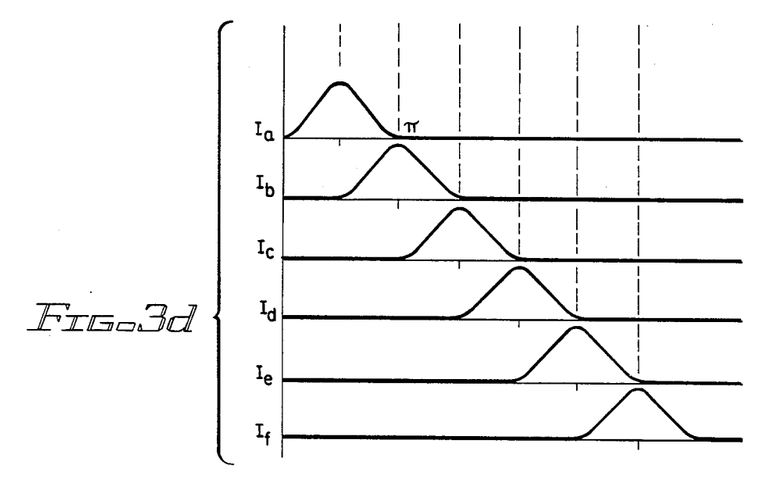
FIG. 3d illustrates the resulting current waveforms in each branch.

FIG. 3c illustrates the commutation timing of the switches 28 (although $T_b$, $T_d$ & $T_f$ are negative for P FET switches, they are shown positive for clarity) and FIG. 3d illustrates the resulting sine-squared current in each inductive element 18 in the respective inductive branches 16 and 20. It is noted that the inductive elements 16 and 20 of each resonant pair are illustrated as being polarized "up" and "down" such that the inductive branch currents can be shown as positive in all instances.

As shown in FIGS. 3b and 3c, the commutation timing of each electronic switch 28 ideally sequentially closes the switches 28 at the zero-crossing of the bus voltage for one cycle of the bus voltage. Thus, the switch 28a of first inductive branch 16 is closed at the first rising zero-crossing of the bus voltage and remains closed for one cycle $T_a$ until the second rising zero-crossing of the bus voltage and is then opened. The switch 28b of the second inductive branch 20 is closed at the first falling zero-crossing of the bus voltage and remains closed for one cycle $T_b$ until the second falling zero-crossing. This sequence is repeated for each inductive pair of the circuit 24 to produce the sine-squared currents $I_{a-f}$ through each inductive element $18a-f$ sequentially displaced in phase by $\pi/2$, which is one-quarter of their period $\pi$ (see FIG. 3d).

As shown in phantom in FIG. 3c, the switches 28 may be closed at or after the preceding zero-crossing of the bus voltage (one-half cycle early) since the respective diodes 26 would be reversed biased and therefore prevent current flow.

Figure 4:
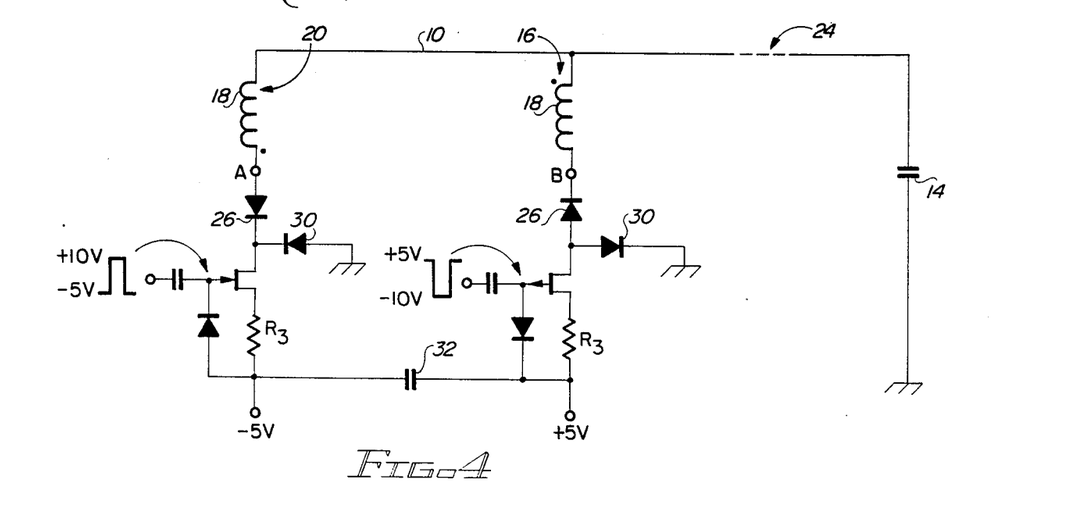
FIG. 4 illustrates paired inductive branches of an improved driver circuit of the invention in which each unidirectional switch thereof employs an additional diode and a resistor for minimizing losses caused by the saturation resistance of the FET switches.

The commutatable switches 28 preferably has a saturation resistance sufficiently low to introduce acceptable losses. However, as shown in FIG. 4, such losses can be improved by employing a ground diode 30 connected to ground and between the other diode 26 and the FET switch 28. In this manner, the dynamic resistance is thus equal to the sum of the forward impedances of the two associated diodes. The diode voltage drops cancel, providing the inductive elements 18 with a effectively grounded point at points A and B when the FETs switches are switched on. Typically, such dynamic resistance can be minimized to 0.1 ohms or less if high conductance diodes are employed.

It is noted that the power loss to the 5 volt supply is substantially reduced by providing a large capacitor 32 between the 5 v supplies. In addition, the FET gate voltage can be shaped to follow the current required by the inductive element 18 thereby resulting in the diode 30 theoretically drawing zero current and the source resistors Rs dissipating only $(I_{peak}\sin^2\theta)^2 R_s$. The net result is over an order of magnitude power reduction.

The driver circuit 24 of the invention may be used to drive many types of multiple inductive elements 18 such as windings of rotating or linear magnetic motors or deflection coils of cathode ray tubes (CRT) and permits substantially transient free commutating between the inductive elements 18 since the switching in an inductive branch 16 and 20 occurs only when both the current and voltage are concurrently zero. Moreover, there are no non-parasitic losses introduced by the driver circuit 24.

DRIVER CIRCUIT FOR CRT

While many applications for the driver circuit 24 exist, the following is a description of the driver circuit 24 used for driving the inductive deflection coils 18 of a linear scan CRT 28.

Figure 5A:
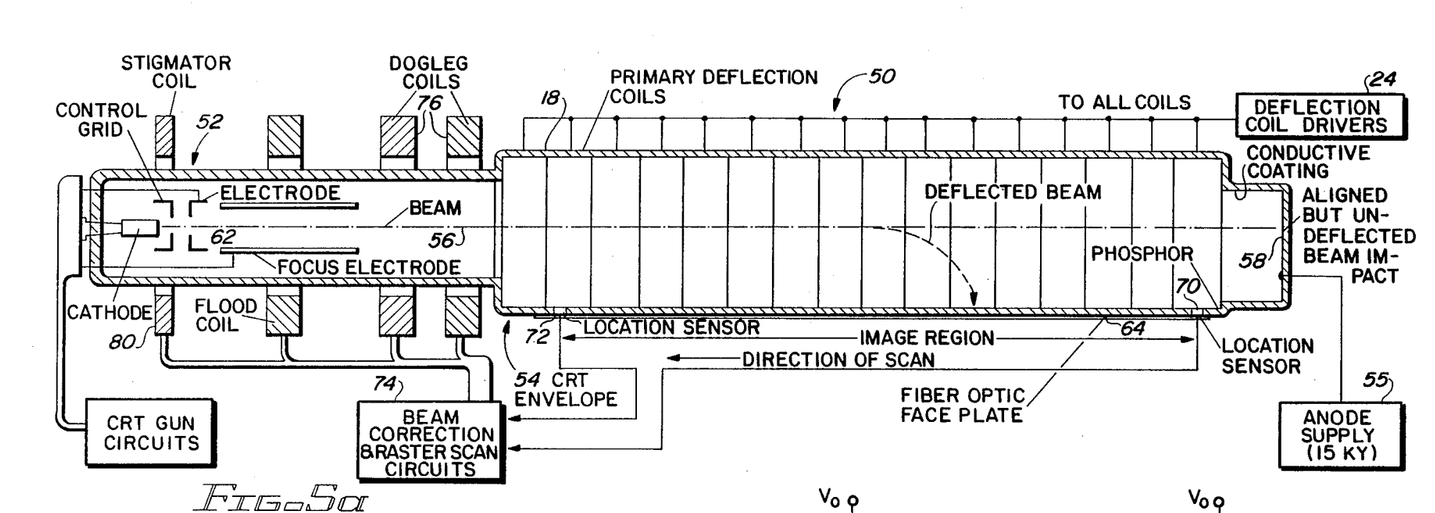
FIGS. 5a and 5b illustrate a linear scan CRT driven by the driver circuit apparatus and method of the invention.
Figure 5B:
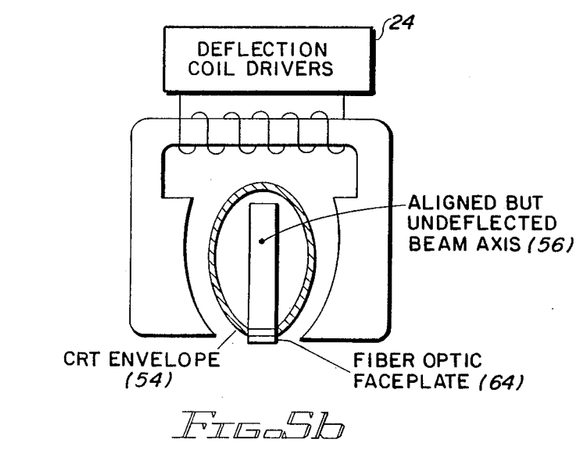

Referring to FIG. 5, a linear scan CRT 50 typically comprises a CRT electron gu 52 positioned within a CRT envelope 54 so as to emit a beam 56 of electrons. The beam 56 is projected along the length of the envelope 54 and, if not deflected, impacts a conductive surface 58 at the end of the envelope 54 which is electrically connected to an anode supply 55. A pair of dog leg deflection coils 72 positioned near the beginning of the beam 56 are provided for deflecting the beam 56 to a paraxial position opposite to a phosphor coated fiber optic face plate 64. A plurality of primary deflection coils 18 are positioned along the envelope 54 to create a plurality of magnetic fields transversely across the envelope 32 to deflect the beam 34 toward the face plate 64, ideally at a constant rate to achieve a linear scan.

The constant rate linear scan is achieved by changing the current in each coil 18 in a smooth and continuous manner such that the current is slowly increased and then decreased in one coil 18 while the adjacent coil 18 is being increased, causing the two coils 18 to be on concurrently at less than their maximum previously determined value. The impact point of the beam 56 will therefore move in a continuous manner.

In this regard, if a magnet is caused to generate a magnetic field which increases and decreases in a $\sin^2(\omega t)$ fashion, and each adjacent magnet is subjected to this same control, but displaced in phase by $\Phi$, such that, for example, a group of coils 18 were sequentially driven by a current $I_0\sin^2(\omega t)$, $I_0\sin^2(\omega t+\Phi)$, $I_0\sin^2(\omega t+2\Phi)$, $I_0\sin^2(\omega t+3\Phi)$, etc., where $\omega$ is the frequency of the function in radians per second and $\Phi$ is the phase angle between adjacent coil current functions, then the beam impact point will move in a near linear fashion. Furthermore, the greater number of coils driven concurrently, the better the linearity. For example, if two coils 18 are driven concurrently ($\Phi$ phase = $\pi/2$), the error is significant, whereas driving 4 coils 18 concurrently ($\Phi$ phase = $\pi/6$), the error is less than 1% of a coil length.

Figure 6:
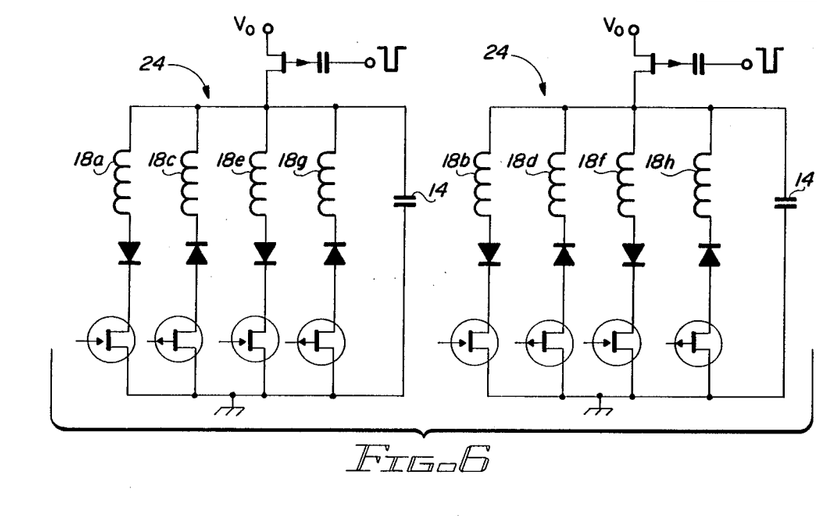
FIG. 6 illustrates two driver circuits of the invention combined.
Figure 7A:
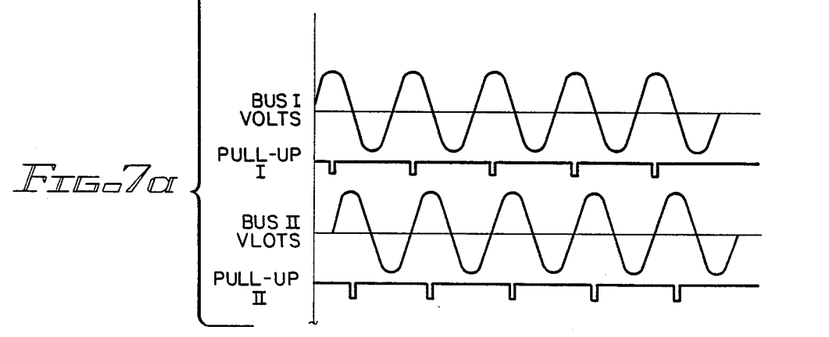
FIG. 7a illustrates the bus voltages and the pull-up timing pulses for the two driver circuits of FIG. 6.
Figure 7B:
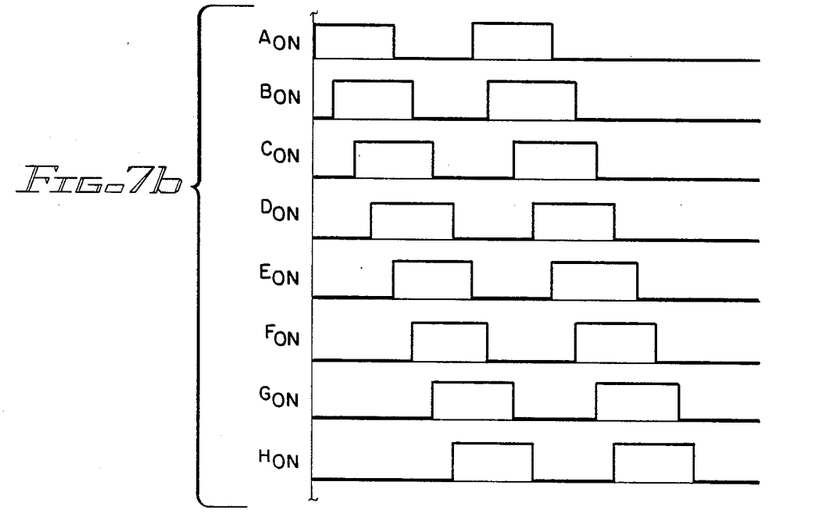
FIG. 7b illustrates the commutation timing diagram for the unidirectional switches and FIG. 7c illustrates each waveforms of the current through the inductive elements 18.
Figure 7C:
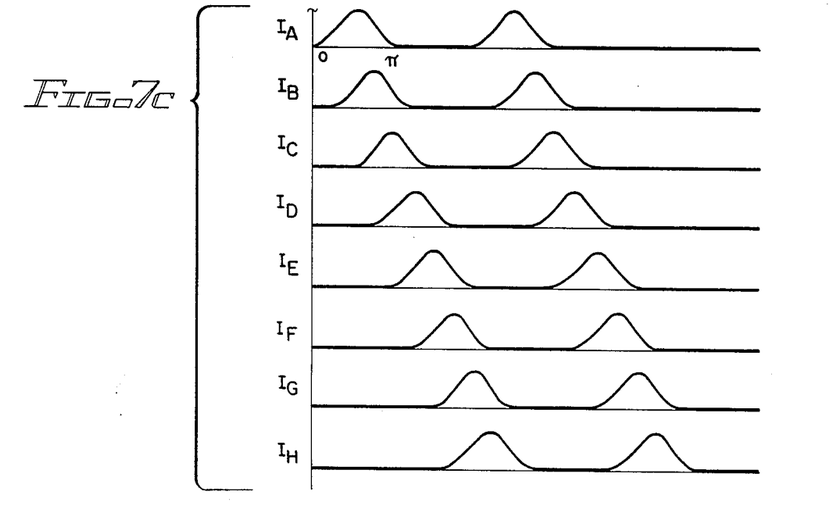

FIG. 6 illustrates two combined driver circuits 24 of the invention, each comprising four inductive branches grouped in two pairs. FIG. 7a illustrates the bus voltages and pull-up pulses both displaced in phase by $\pi/4$ of the sine-squared waveforms $I_{a-f}$ (one quarter of the period of the sine-squared currents). FIG. 7b illustrates the timing diagram for the commutation of the switches 28. The resulting sine-squared current waveforms in the inductive deflection coils 18 displaced in phase by $\pi/4$ (one quarter of the period $\pi$ of the sine-squared currents) are illustrated in FIG. 7c. It is readily apparent that the commutation of each switch 28 occurs when the current and voltage in that branch and the bus capacitor 14 are concurrently zero, thereby permitting substantially transient-free commutating between the inductive coils 18.

CORRECTION OF ERRORS

However, idealized switching at zero voltage and current conditions is influenced by: (1) coil inductance variations; (2) coil and related circuit losses; (3) coil coupling effects; and (4) end effect coupling errors, each discussed below.

1. Coil Inductance Variations

Figure 8:
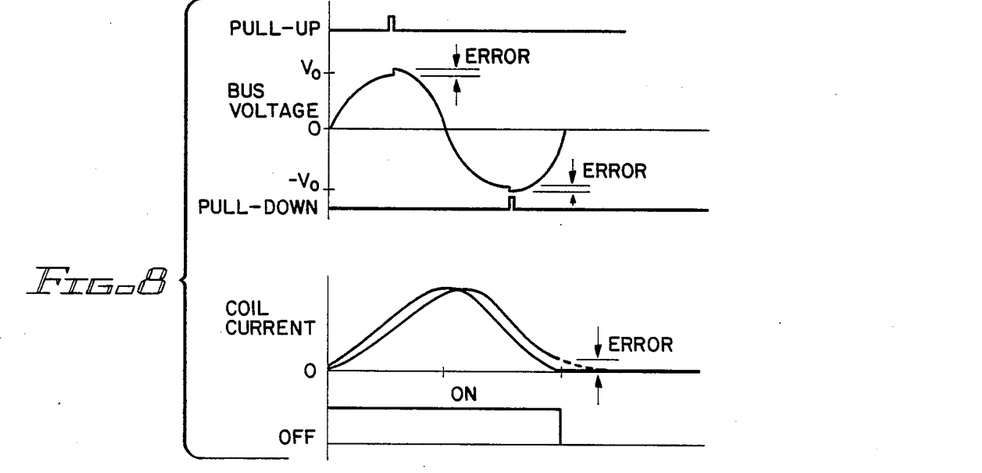
FIG. 8 illustrates the resonant frequency variations caused by coil inductance variations and the correction thereof.

Referring to FIG. 8, coil inductance variations cause the resonant frequency to vary over the extent of the multi-coil assembly. Since the switching occurs at the time where the sine-squared $\theta$ waveform is defined by $\theta=0, \pi, 2\pi \ldots N\pi$, the variation in current amplitude at a predescribed crystal controlled instant in time, designed to be coincident with $\theta=0, \pi, 2\pi \ldots N\pi$, will be in error in accordance with the relation $\cos(\theta \pm \Delta\theta) = 1 + \epsilon$, where $\Delta\theta$ is the error in time of the oscillation zero relative to the system clock, and $\epsilon$ is the resulting amplitude error. The cosine relation is used since the voltage "pull-up" is pulsed at a cosine peak ($\theta=0, \pi, 2\pi \ldots n\pi$) and the $\sin^2\theta = (1+\cos 2\theta)/2$ is switched at $2\theta=0, \pi, 2\pi \ldots n\pi$. It is noted that the voltage waveform can be pulled up to $V_o$ at the time indicated or down to $-V_o$ $\pi/2$ radians later. It can be shown that the time error is related to the coil variation in inductance by $f_0 = 1/(2\pi\sqrt{LC})$ or $T_o = 2\pi\sqrt{LC}$, where:

$f_0$ = resonant frequency in radius/sec.
$T_0$ = time for one cycle ($2\pi$) seconds
$L$ = coil inductance in henrys
$C$ = resonant capacitor in farads By selecting a capacitor with a suitable temperature coefficient of capacitance, and a coil of $2\theta\theta$ turns as an example, the inductance L can be controlled in accordance with:

$T_0 = 2\pi\sqrt{LC}$
$L = (K_1N)^2$, where $K_1$ = coil constant
$T_0 = 2\pi K_1 N\sqrt{C}$
$T_0 = K_0 N$, where $K_0 = 2\pi K_1\sqrt{C}$
Thus: $dT_0/dN$ = a constant.

For the example stated, one turn of coil wire represents $\frac{1}{2}\%$ of time change, or 1.8° of 360°. The cosine of 1.8° constitutes a pull-up voltage error of 0.05% of the half amplitude of the peak to peak sinusoidal waveform. The sine-squared current error results in a switching transient of 0.025% of the total current amplitude.

Other forms of inductive tuning can be employed, but must not adversely effect the uniformity of the flux field in the deflection region.

2. Coil and Related Circuit Losses

Another factor influencing transient switching is the loss present in the resonant circuit containing the coils, capacitor and switches. The net resistance of this circuit can be represented by a single series resistance in each coil element. The oscillation will be damped by this resistor as a function of its value in accordance with the "L/R" time constant associated with damped oscillating systems (see FIG. 9). Coil resistance can be reduced by selecting a large wire size (cross-sectional area) but space considerations limit the ultimate resistance value. Core losses can be reduced by employing materials suitable for the frequency of the oscillation. Capacitor losses are typically substantially less than coil losses. Switching losses have been previously discussed and through the use of the diode switch, can be kept quite low.

Figure 9:
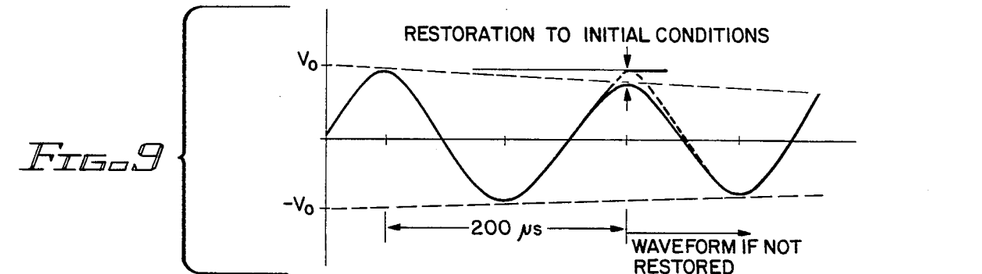
FIG. 9 illustrates the uncorrected oscillation damping.

For example, a 2.5 milihenry coil consisting of 200 turns suitable for a deflection system can be wound with a resistance of 0.3 ohms. The switch resistance can be kept below 0.1 ohms. Other losses are neglected for this discussion. The L/R ratio is thus 2.5 mhy/0.4v$\Omega$ or 6.250 milliseconds. The oscillation period employed was 200/$\mu$ seconds. Referring to FIG. 9, corrections were introduced to restore initial conditions each cycle (200/$\mu$ seconds). Thus a time of only $1.6\times 10^{-22}$ L/R will have occurred between corrections. This represents a 1.6% correction transient when initial conditions are restored. (At time $<<$L/R, $A_0 e^{-t/(2L/R)} = A_0(1-(tR)/2L)$ or the error $=(tR)/2L\times 100\%$ of half peak to peak amplitude). This 1.6% correction introduces a current/voltage non zero switching condition.

The error introduced can be corrected by introducing a phase shifted voltage, in series with the common bus capacitor, that places a voltage across the resistive component of the coil that is in phase with the current flowing through the coil (see FIG. 10). This coupled signal is termed a "pump" and effectively cancels the effect of the circuit losses, reducing the resistance caused transient error to an acceptable level.

Figure 10A:
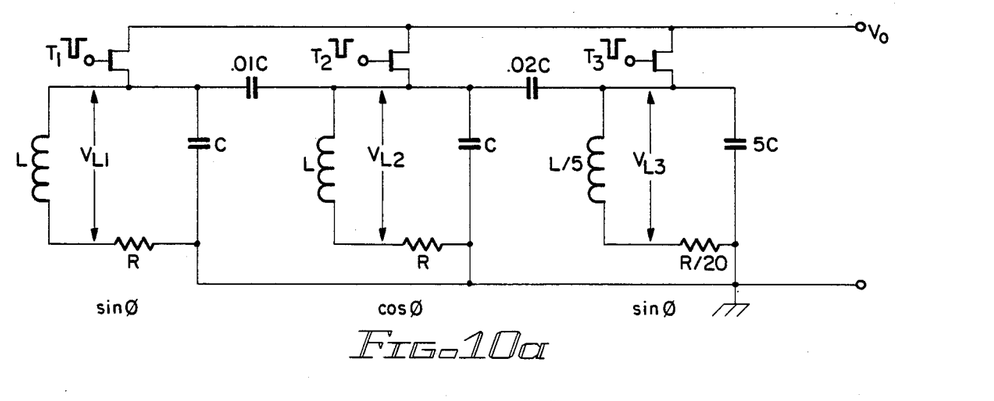
FIG. 10 illustrates the circuit of the pump employed to correct oscillation damping.
Figures 10B, 10C:
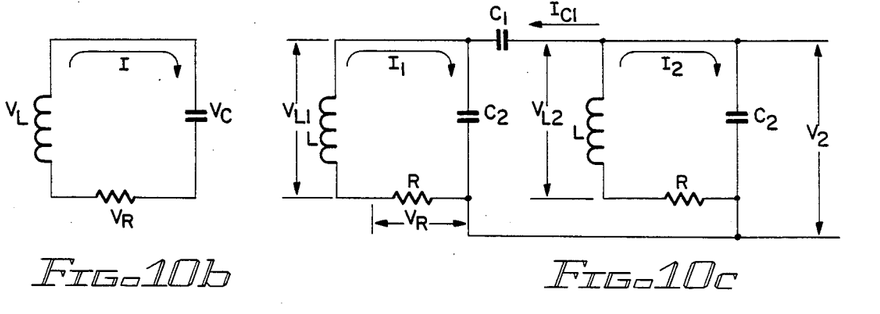

More particulary, FIG. 10a illustrates one embodiment of a pump circuit for introducing phase shifted voltage in series with the bus capacitor 14. FIG. 10b illustrates a common tank circuit and the following equations define the transient voltages in the tank circuit: assume $R/\omega L = 0.01$, for example $R = 0.5$ $L = 0.125 \times 10^{-3}$ $\omega = 40 \times 10^3$ then $V_L + V_C + V_R =$ $V^*_{L1}(\text{ideal}) = \sin \Phi$ $I^*_{L1}(\text{ideal}) = -1/L \int V_1 dt = \cos \Phi/\omega L$ $V_c = -V^*_L - V_R = L \, dI/dt$
$-IR = K_1\sin\Phi - R\cos\Phi/\Phi L$ With regard to the circuit shown in FIG. 10c, assume $C_1 << C_2$ and $V_R << V_L$, then $V^*_1 = \sin\Phi$ $V^*_2 = \cos\Phi$ $V_{c1} = \sin\Phi(1-C_1/C_2) + C_1/C_2 \cos\Phi$ $V_{L1} = \sin\Phi(1-C_1/C_2) + C_1/C_2 \cos\Phi - R\cos\Phi/\omega L$ $V_{L1} = 0.99 \sin\Phi$, if $C_1/C_2 = R/\omega L$ $$V_{L2} = \cos\Phi(1 - C_1/C_2) + C_1/C_2 \sin\Phi$$

$$V_{L2} = \cos\Phi(1 - C_1/C_2) + C_1/C_2 \sin\Phi + R\sin\Phi/\omega L$$

pti $V_{L2} = 0.99 \cos\Phi + 2R/\omega L \sin\pm$, if $C_1/C_2 = R/\omega L$
By adding a third "pump" tank of $-\sin\Phi$ as shown in FIG. 10a with a coupling of 0.02, $V_{L2} = 0.99 \cos\Phi$. With capacitor having 2/5 of coupling load to $\cos\Phi$ circuit and ¼ IR voltage, $V_{L3} = \sin\Phi(1 - 0.02/5) - 0.02/5\cos\Phi - 0.02/5\cos\Phi$ and $V_{L3} = \sin\Phi(1996) -$. Thus, pump CRT loss is reduced by making C large and R small. This is practical since the pump coil is not constrained by CRT layout and magnetic flux path.

3. Coil Coupling Effects

Two systems thus corrected, each possessing a series of coil switches, common capacitor and pump, are caused to resonate, physically remote from one another. As the coil elements are brought together to form this array of interlaced coils, the flux from coils couple into their neighbors. This coupling can be substantial, varying between 5% and 20% as coil separation varies from 0.5 inches to 0.1 inches in the example stated. Since the neighbor coils are each contributing a single $\sin^2\theta$ flux transition at a phase separation of $\pi/4$, the total coupled flux introduces a flux that starts one sector prior to the primary flux period and extends one section beyond the primary flux period (see FIG. 11). During the primary period when both adjacent coils are on, the flux is constant $(\sin^2\theta + \sin^2(\theta + \pi/2) = 1$. This flux couple introduces a reverse flux in the adjacent coil.

Figure 11:
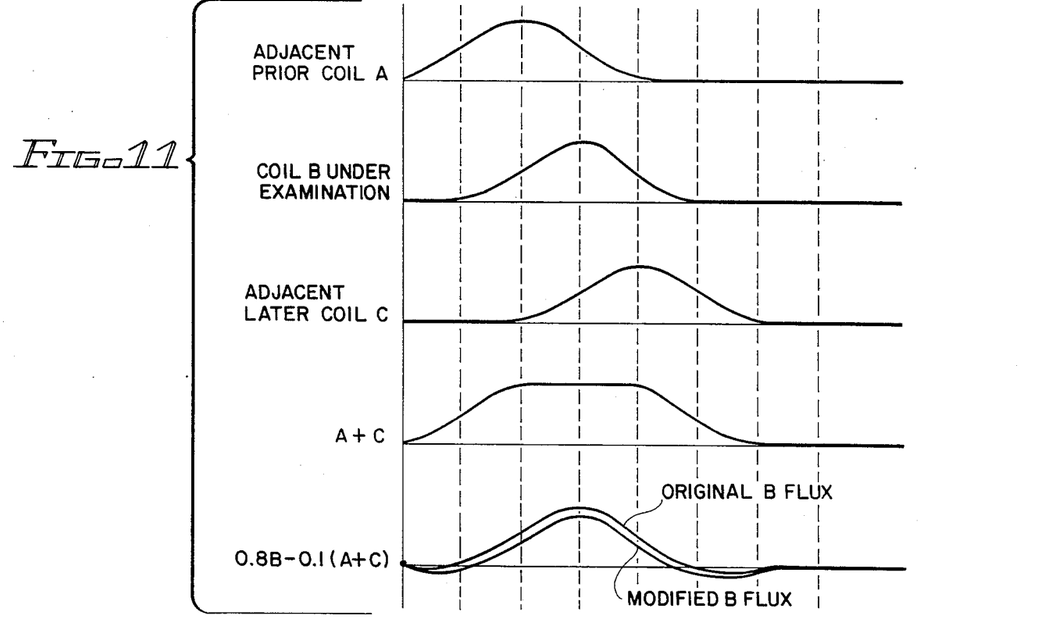
FIG. 11 illustrates the cross-coupling of the adjacent coils.
Figure 12:
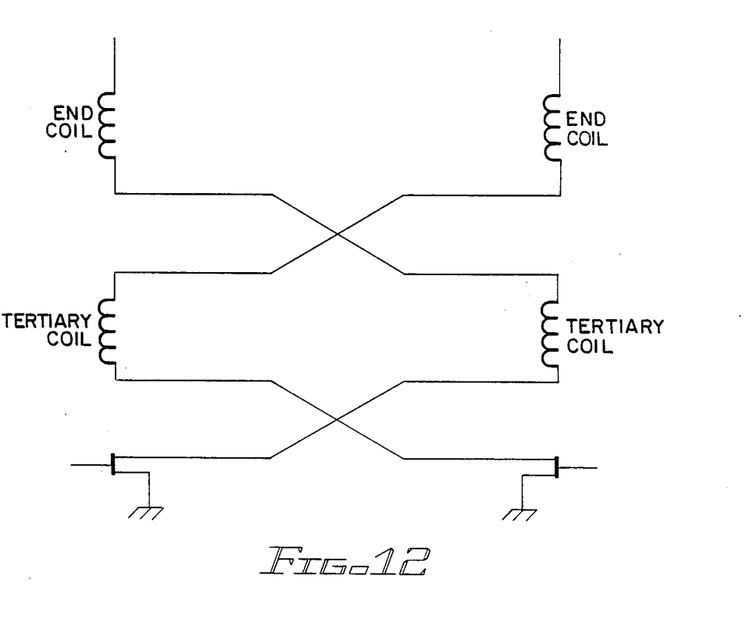
FIG. 12 illustrates a tertiary winding for end coils for reducing end effects.

For example, a 10% couple reduces the flux in the primary coil to 80% (10% to each neighbor), while receiving a $-10\%$ flux from each neighbor that starts one period prior to the period under examination, and ends one period later. Second order effects modify this result due to the "multi-body" nature of this interaction. Furthermore, this interaction creates an error that is itself composed of sinusoidal waveforms that can be introduced as a correction to cancel their effect. The interaction also modifies the resonance of the tank circuit, further modifying the effect.

It has been shown that the above "coupling" effect is compatible with the required linear deflection requirements through the employment of a single beam position offset waveform in the dog-leg configuration.

4. End Effect Coupling Errors

End effect occurs since the described coupling effects are modified in a linear coil array during the transition from the last to first coil. Through the use of a tertiary winding on the end coils (8 turns in the example stated) the flux couple is synthesized by joining these windings as shown in FIG. 10.

Alternatively, the couple could be employed to cancel the coupling effect between adjacent coils, making all coils appear to have near zero coupling. Two additional windings would be required for each coil, as opposed to one winding on each of the end coils as described previously. Depending upon the application and resulting design considerations, this approach may be preferred.

ELECTRON BEAM ERROR DETECTION

As shown in FIG. 5a, photodiodes 70 and 72 are positioned at the beginning and end of the fiber optic face plate 64 corresponding to the intended beginning and end of the linear scan to detect the same. The output of the photo diodes 70 and 72 are each processed to produce an integrated output having a DC component, the difference thereof being representative of a common displacement of the beginning and end of the linear scan and the addition thereof being representative of linear scan length error. This information is then further processed to provide centering components to the beam correction circuits 74 specifically controlling dog leg coils 76.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,
What is claimed is:

1. A driver circuit for driving at least four inductive elements, comprising in combination:
    a resonant bus including voltage initialization means;
    a bus capacitor means connected to said resonant bus;
    at least four inductive branches connected to said resonant bus, each said inductive branch including a commutatable unidirectional switch means serially connected to one of the inductive elements, said inductive branches being grouped in pairs with each commutatable unidirectional switch means in each pair being oriented in reverse directions to allow current flow to and from said resonant bus when commutated; and
    means for commutating said commutatable unidirectional switch means such that said commutatable unidirectional switch means oriented to allow current flow from said resonant bus are sequentially commutated at or after a falling zero-crossing of the bus voltage and at least by or upon a rising zero-crossing of the bus voltage and such that said commutatable unidirectional switch means oriented to allow current flow to said resonant bus are sequentially commutated at or after a rising zero-crossing of the bus voltage and at least by or upon a falling zero-crossing of the bus voltage,
    whereby, sine-squared currents are sequentially produced in each said inductive branches displaced in phase by one-half of the period of the sine-squared currents and inverted and a sinusoidal current is produced in said bus capacitor.

2. The driver circuit as set forth in claim 1, wherein said commutatable unidirectional switch comprises series connected diode and a commutatable switch.

3. The driver circuit as set forth in claim 2, including a first and a second said driver circuit with said inductive branches thereof interleaved, and wherein said commutation means of said second driver circuit is displaced in phase by one-quarter of the period of the sine-squared currents from said commutation means of said first driver circuit such that up to four of the interleaved said inductive branches are commutated concurrently, whereby sine-squared currents are produced in the interleaved said inductive branches inverted in phase by one-quarter of the period of the sine-squared currents.

4. The driver circuit as set forth in claim 3, wherein the inductive elements comprise an array of inductive deflection coils displaced from each other by one-quarter of the period of the sine-squared currents to create a magnetic field such that charged particles passing therethrough are linearly deflected.

5. The driver circuit as set forth in claim 4, wherein said charged particles comprise an electron beam produced by an electron gun of an elongated envelope of a cathode ray tube and wherein said inductive deflection coils are positioned along the length of said cathode ray tube to deflect said electron beam onto a longitudinal surface of said cathode ray tube to create a linear scan.

6. The driver circuit as set forth in claim 5, wherein said longitudinal surface of said cathode ray tube comprises a phosphor coating and wherein a fiber optic face plate is positioned along said longitudinal surface.

7. The driver circuit as set forth in claim 5, further including a location sensor positioned at the beginning and end of said fiber optic face plate for detecting misalignments of said linear scan.

8. The driver circuit as set forth in claim 7, wherein said electron beam is paraxial to said cathode ray tube.

9. The driver circuit as set forth in claim 2, further including a ground diode connected between said series connected diode and said commutatable switch.

10. The driver circuit as set forth in claim 2, further including means for pulling-up the bus voltage at the rising peak of the bus voltage to minimize losses due to inductance variation in the inductive elements.

11. The driver circuit as set forth in claim 4, further including a tertiary winding wound on said inductive deflection coils positioned at the ends of the array to synthesized flux in said end inductive deflection coils to reduce end effects.

12. The driver circuit as set forth in claim 4, further including a bus pump to reduce adverse magnetic coupling of adjacent said coils.

13. A driver circuit for driving at least two inductive elements, comprising in combination:
a resonant bus including voltage initialization means;
a bus capacitor means connected to said resonant bus;
at least two inductive branches grouped in an inductive pair and connected to said resonant bus, each said inductive branch in said inductive pair including serially connected one of the inductive elements and a diode means, said diode means in one of said inductive branches being connected in reverse direction relative to the other in the other said inductive branch to allow current flow in the one said inductive branch to flow from said resonant bus and to allow current flow in the other said inductive branch to flow to said resonant bus, whereby, upon initialization of said resonant bus, a sine-squared current is produced in each said inductive branches inverted with respect to the other and a sinusoidal current is produced in said bus capacitor.

14. The driver circuit as set forth in claim 13, wherein each said inductive branch further includes a commutatable switch mean serially connected with said inductive element and said diode and further including means for commutating said commutatable switch means such that said commutatable switch means in the one said inductive branch is commutated at or after a falling zero-crossing of the bus voltage and at least by or upon a rising zero-crossing of the bus voltage and such that said commutatable switch means in the other said inductive branch is commutated at or after a rising zero-crossing of the bus voltage and at least by or upon a falling zero-crossing of the bus voltage.

15. The driver circuit as set forth in claim 14, further including at least four said inductive branches for driving at least four inductive elements such that, upon commutation of said commutatable switch means, the sine-squared currents produced in each said inductive branches are displaced in phase by one-quarter of the period of the sine-squared currents.

16. A method for driving a least four inductive elements, comprising in combination:
initializing a resonant bus including a bus capacitor means and at least four inductive branches connected to said resonant bus, each said inductive branch including a commutatable unidirectional switch means serially connected to one of the inductive elements, said inductive branches being grouped in pairs with each commutatable unidirectional switch means in each pair being oriented in reverse directions to allow current flow to and from said resonant bus when commutated; and
commutating said commutatable unidirectional switch means such that said commutatable unidirectional switch means oriented to allow current flow from said resonant bus are sequentially commutated at or after a falling zero-crossing of the bus voltage and at least by or upon a rising zero-crossing of the bus voltage and such that said commutatable unidirectional switch means oriented to allow current flow to said resonant bus are sequentially commutated at or after a rising zero-crossing of the bus voltage and at least by or upon a falling zero-crossing of the bus voltage,
whereby, sine-squared currents are sequentially produced in each said inductive branches displaced in phase by one-half of the period of the sine-squared currents and inverted and a sinusoidal current is produced in said bus capacitor.

17. The method as set forth in claim 16, wherein said commutatable unidirectional switch comprises series connected diode and a commutatable switch.

18. The method as set forth in claim 17, including a first and a second said resonant bus with said inductive branches thereof interleaved, and wherein said commutating of said second driver circuit is displaced in phase by one-quarter of the period of the sine-squared currents from said commutating of said first driver circuit such that up to four of the interleaved said inductive branches are commutated concurrently, whereby sine-squared currents are produced in the interleaved said inductive branches inverted in phase by one-quarter of the period of the sine-squared currents.

19. The method as set forth in claim 18, wherein the inductive elements comprise an array of inductive deflection coils displaced from each other by one-quarter of the period of the sine-squared currents to create a magnetic field and further including the step of passing charged particles therethrough to be deflected.

20. The method as set forth in claim 19, wherein said charged particles comprise an electron beam produced by an electron gun to travel down an elongated envelope of a cathode ray tube and wherein said inductive deflection coils are positioned along the length of said cathode ray tube such that the step of deflecting said electron beam onto a longitudinal surface of said cathode ray tube creates a linear scan.

21. The method as set forth in claim 20, wherein said longitudinal surface of said cathode ray tube comprises a phosphor coating and wherein a fiber optic face plate is positioned along said longitudinal surface.

22. The method as set forth in claim 21, further including the step of detecting misalignments of said linear scan.

23. The method as set forth in claim 22, wherein said electron beam travels paraxial to said cathode ray tube.

24. The method as set forth in claim 17, further including a ground diode connected between said series connected diode and said commutatable switch.

25. The method as set forth in claim 17, further including the step of pulling-up the bus voltage at the rising peak of the bus voltage to minimize losses due to inductance variation in the inductive elements.

26. The method as set forth in claim 19, further including the step of synthesizing flux in end inductive deflection coils to reduce end effects.

27. The method as set forth in claim 19, further including the step of introducing a phase shifted voltage to reduce resistance-caused transient error.

28. A method for driving at least two inductive elements, comprising the steps of initializing a resonant bus including a bus capacitor means and at least two inductive branches grouped in an inductive pair and connected to said resonant bus, each said inductive branch in said inductive pair including serially connected one of the inductive elements and a diode means, said diode means in one of said inductive branches being connected in reverse direction relative to the other in the other said inductive branch to allow current flow in the one said inductive branch to flow from said resonant bus and to allow current flow in the other said inductive branch to flow to said resonant bus to produce a sine-squared current in each said inductive branches inverted with respect to the other and to produce a sinusoidal current in said bus capacitor.

29. The method as set forth in claim 28, further including the step of commutating each said inductive branches such that commutatable switch means in the one said inductive branch is commutated at or after a falling zero-crossing of the bus voltage and at least by or upon a rising zero-crossing of the bus voltage and such that said commutatable switch means in the other said inductive branch is commutated at or after a rising zero-crossing of the bus voltage and at least by or upon a falling zero-crossing of the bus voltage.

30. The method as set forth in claim 29, further including at least four said inductive branches for driving at least four inductive elements such that, upon commutation of said commutatable switch means, the sine-squared currents produced in each said inductive branches are displaced in phase by one-quarter of the period of the sine-squared currents.

* * * * *